No. 890,485. PATENTED JUNE 9, 1908.
G. E. ALPHIN.
COMBINED CULTIVATOR AND FERTILIZER DISTRIBUTER.
APPLICATION FILED JAN. 6, 1908.
2 SHEETS—SHEET 1.
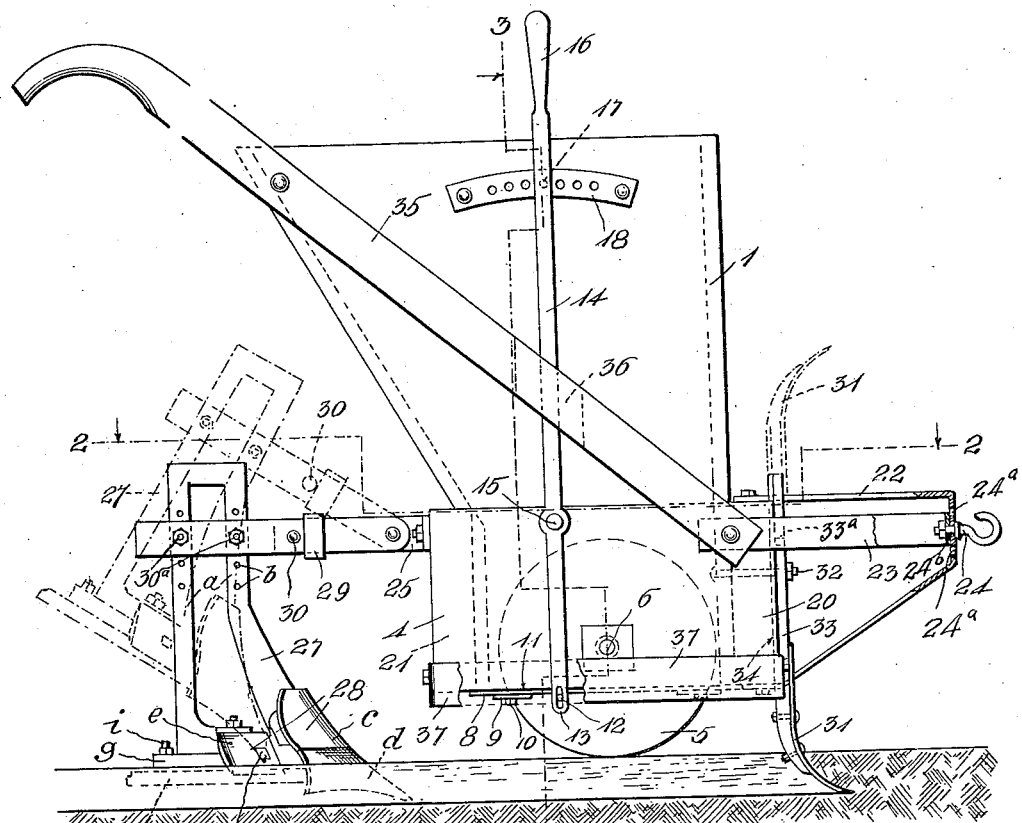
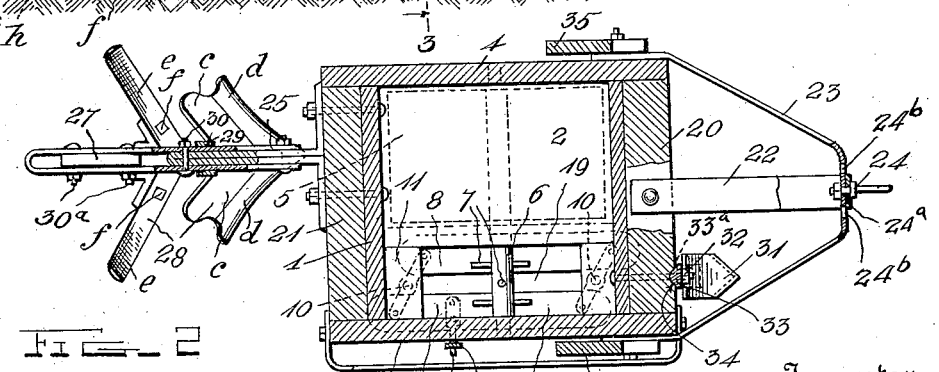
Witnesses
Inventor
Gilbert E. Alphin
By H. B. Willson & Co
Attorneys No. 890,485. PATENTED JUNE 9, 1908.
G. E. ALPHIN.
COMBINED CULTIVATOR AND FERTILIZER DISTRIBUTER.
APPLICATION FILED JAN. 6, 1908.
2 SHEETS—SHEET 2.
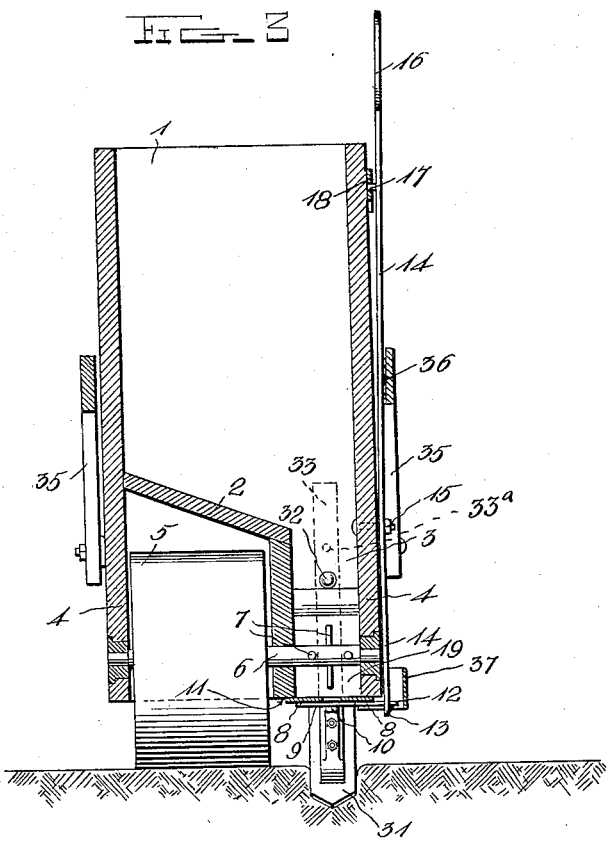
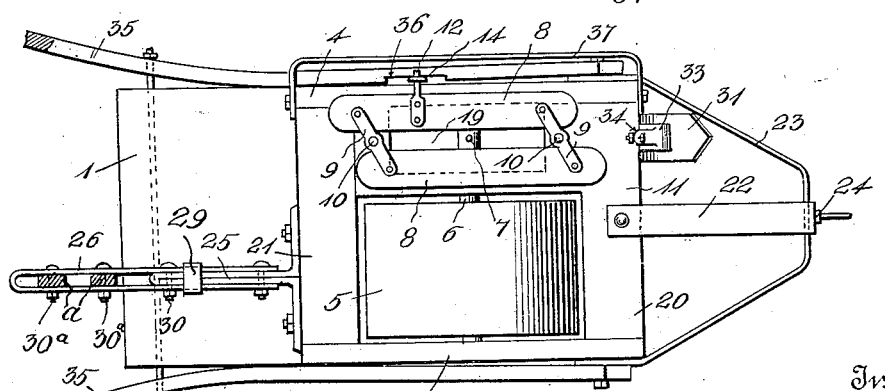
Witnesses
Inventor
Gilbert E. Alphin
By H. B. Wilson & Co
Attorneys

UNITED STATES PATENT OFFICE.

GILBERT E. ALPHIN, OF MOUNT OLIVE, NORTH CAROLINA.

COMBINED CULTIVATOR AND FERTILIZER-DISTRIBUTER.

No. 890,485.  Specification of Letters Patent.  Patented June 9, 1908.

Application filed January 6, 1908. Serial No. 409,514.

*To all whom it may concern:*

Be it known that I, GILBERT E. ALPHIN, a citizen of the United States, residing at Mount Olive, in the county of Wayne and State of North Carolina, have invented certain new and useful Improvements in a Combined Cultivator and Fertilizer-Distributer; and I do declare the following to be a full, clear, and exact description of the invention, such as will enable others skilled in the art to which it appertains to make and use the same.

My invention relates to combined cultivators and fertilizer distributers, and the object of the invention is to provide a device of this character which will be efficient in operation, easy to handle, cheap in construction and provided with means to regulate the feed of the fertilizer.

With this object in view, the invention consists of certain novel features of construction, combination and arrangement of parts as will be described hereinafter and particularly pointed out in the appended claims.

In the accompanying drawings, Figure 1 is a view in side elevation; Fig. 2 is a horizontal sectional view on the line 2—2 of Fig. 1; Fig. 3 is a vertical sectional view on the line 3—3 of Fig. 1; and Fig. 4 is a bottom plan view.

Referring more especially to the drawings, 1 represents a hopper, which is provided with a downwardly inclined bottom, 2, and a feed chute, 3. This bottom and the side, 4, which supports it cover the supporting wheel, 5, which is carried upon the shaft, 6, journaled in the sides of the hopper and in the side member 4. The shaft carries a series of radially projecting fingers, 7, which are arranged within the feed chute so as to agitate and assist in feeding the fertilizer. Covering the bottom of the feed chute I provide a pair of parallel doors or cut-offs, 8, which are pivotally secured to arms, 9, which in turn have a central pivot connection, 10, with the bottom, 11. Projecting from the side of one of the doors is a stub shaft or pintle, 12, which is connected to the slotted end, 13, of a lever, 14, which is pivoted at 15 to the side of the hopper and is provided at its upper end with an operating handle, 16, and a laterally projecting pin, 17, to engage a plate, 18 having a plurality of apertures.

By manipulating the handle, the parallel doors are worked so as to close, or open the aperture 19 at the bottom of the feed chute, 3. Upon the front and back of the hopper I secure what I shall term "front and back" plates, 20 and 21, to the former of which is secured the draft irons, 22 and 23, both being connected at their forward ends by an eye-bolt, 24, which is used in the holes $24^a$ and $24^b$ to adjust the irons. To the back plate I secure in alinement with the wheel, 5, a bracket, 25, which has pivoted thereto a plow supporting beam, 26, comprising a U-shaped member, between the legs of which is secured a standard, 27, of the plow, 28. The standard of the plow comprising two parallel members $a$ having a plurality of apertures $b$ through which the bolts $30^a$ are adapted to pass so as to adjust the height of the plow upon the beam 26. This plow comprises a pair of plates $c$ and $d$ forming a furrow point and being secured to the forward standard in any suitable manner, and a pair of rearwardly extending inclined wings or longitudinal arms $e$ secured to the rear standard by bolts $f$. A plate $g$ connects the two standards and has secured upon its bottom wear shoe $h$, attached to the plate by means of the bolt $i$. The wings $e$ extend out beyond the plow points $c$ and $d$, and are arranged so as to present to the ground a cutting edge, which destroys all weeds and at the same time turns over the ground which is loosened by the plow point. A rectangular band, 29, is passed over the plow beam, 26, and the bracket, 25, and works in conjunction with a bolt, 30, to hold the beam parallel with the bracket and the plow in operative position.

As shown in dotted lines, the plow beam and plow may be thrown up out of engagement with the ground or to an inoperative position for passing from field to field by removing the bolt, 30, and slipping the band off of the bracket, 25, and then sliding it back so that its bottom engages the bracket and inserting the bolt, 30, to prevent its slipping toward the plow beam. A cultivator, 31, is secured to the forward plate, 20, by means of a bolt, 32, which passes through the standard, 33, thereof. This standard is rounded upon its back face as shown so as to enter a groove, 34, formed in the front plate to prevent turning of the standard. As shown in dotted lines the standard may be reversed and the plow thrown to inoperative position. A plurality of holes $33^a$ are provided for adjustment.

Bolted to the sides of the hopper and extending diagonally there across are the operating handles, 35, one of which is notched at 36, to permit the passage of the lever, 14. A suitable guard, 37, is secured along the side of the hopper so as to protect the lever, 14.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters Patent, is:

1. In a device of the class described, the combination with a supporting bracket, of a substantially U-shaped plow beam straddling said bracket, a plow carried by said plow beam, means encompassing the plow beam and the bracket for holding the parts in operative position, and means to prevent the displacement of the holding means.

2. In a device of the class described, the combination with a supporting bracket, of a substantially U-shaped plow beam straddling said bracket, a plow carried by the plow beam, a retaining ring surrounding the plow and the bracket for the holding of parts in operative position, and a bolt passing through the bracket and the plow beam for holding the ring in position.

3. In a device of the class described, the combination with a supporting bracket, of a U-shaped plow beam straddling said bracket and pivoted thereto, a plow carried by said plow beam, means encompassing the plow beam and the bracket for holding the parts in operative or inoperative position, and means passing through the plow beam for holding the encompassing means from displacement in either the operative or inoperative positions of the parts.

In testimony whereof I have hereunto set my hand in presence of two subscribing witnesses.

GILBERT E. ALPHIN.

Witnesses:
S. A. BIRD,
E. W. FOUVIELLE.